(12) United States Patent
Caronni et al.

(10) Patent No.: US 7,590,632 B1
(45) Date of Patent: *Sep. 15, 2009

(54) METHOD FOR SERIALIZER MAINTENANCE AND COALESCING

(75) Inventors: Germano Caronni, Menlo Park, CA (US); Raphael J. Rom, Palo Alto, CA (US); Glenn C. Scott, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 11/045,237

(22) Filed: Jan. 28, 2005

Related U.S. Application Data

(60) Provisional application No. 60/617,912, filed on Oct. 12, 2004.

(51) Int. Cl.
*G06F 7/00* (2006.01)
*G06F 17/30* (2006.01)
*G06F 17/00* (2006.01)
*G06F 3/00* (2006.01)
*G06F 9/44* (2006.01)
*G06F 9/46* (2006.01)
*G06F 13/00* (2006.01)

(52) U.S. Cl. .............. 707/10; 707/103 X; 707/203; 719/330

(58) Field of Classification Search .............. 719/330; 707/103 X
See application file for complete search history.

(56) References Cited

U.S. PATENT DOCUMENTS

| 5,640,564 | A | 6/1997 | Hamilton et al. |
| 5,907,837 | A | 5/1999 | Ferrel et al. |
| 6,629,203 | B1 | 9/2003 | Humlicek |
| 2002/0133491 | A1 | 9/2002 | Sim et al. |
| 2002/0174275 | A1 | 11/2002 | Jay et al. |
| 2003/0055805 | A1 | 3/2003 | Gardner |
| 2005/0015775 | A1* | 1/2005 | Russell et al. ............... 719/315 |
| 2005/0165724 | A1* | 7/2005 | West .............................. 707/1 |
| 2005/0262097 | A1* | 11/2005 | Sim-Tang et al. ............. 707/10 |
| 2006/0168154 | A1 | 7/2006 | Zhang et al. |
| 2006/0179037 | A1 | 8/2006 | Turner et al. |

(Continued)

OTHER PUBLICATIONS

U.S. Appl. No. 11/045,223, filed Jan. 2005, Caronni et al.*

(Continued)

*Primary Examiner*—Neveen Abel Jalil
*Assistant Examiner*—Raheem Hoffler
(74) *Attorney, Agent, or Firm*—Osha • Liang LLP

(57) ABSTRACT

A method for serializer maintenance and coalescing in a distributed object store (DOS) including a first partition and a second partition, involving requesting an update of an object, wherein the object includes an active globally unique identifier (AGUID) object and at least one version globally unique identifier (VGUID) object, wherein the least one VGUID object includes a first generation number and a first serializer name, determining whether a first serializer is located in the first partition using the first serializer name, wherein the first serializer is associated with the first generation number, if the first serializer is not located in the first partition, constructing a second serializer using the first serializer name, assigning a second generation number to the second serializer, obtaining an order of the update to the object using the second serializer, and creating a new VGUID object.

31 Claims, 9 Drawing Sheets

U.S. PATENT DOCUMENTS

2007/0094312 A1* 4/2007 Sim-Tang .................. 707/204

OTHER PUBLICATIONS

A. Adya, et al.; "Farsite: Federated, Available, and Reliable Storage for an Incompletely Trusted Environment"; Proceedings of the $5^{th}$ Symposium on Operating Systems and Design Implementation OSDI; Dec. 2002 (14 pages).

I. Clarke, et al.; "Freenet: A Distributed Anonymous Information Storage and Retrieval System"; Lecture Notes in Computer Science; 2000 (21 pages).

J. Kubiatowicz, et al.; "OceanStore: An Architecture for Global-Scale Persistent Storage"; Proceedings of ACM ASPLOS; Nov. 2000 (12 pages).

A. Rowstrorn, et al.; "Storage Management and Caching in PAST, a Large-Scale, Peristent Peer-to-Peer Storage Utility"; Symposium on Operating Systems Principles; Oct. 2001 (13 pages).

S. Quinlan et al.; "Venti: A New Approach to Archival Storage"; Proceedings of the FAST 2002 Conference on File and Storage Technologies; First USENIX Conference on File and Storage Technologies; Jan. 2002 (14 pages).

A. Muthitacharoen, et al.; "Ivy: A Read/Write Peer-to-Peer File System"; Proceedings of the $5^{th}$ USENIX Symposium on Operating Systems Design and Implementation (OSDI '02); Dec. 2002 (23 pages).

F. Dabek, et al.; "Towards a Common API for Structured Peer-to-Peer Overlays"; Proceedings of $2^{nd}$ International Workshop on Peer-to-Peer Systems (IPTPS '03), Feb. 2003 (11 pages).

I. Stoica, et al.; "Chord: A Scalable Peer-to-Peer Lookup Service for Internet Applications"; Proceedings of the SIGCOMM 2001 Conference on Applications, Technologies, Architectures, and Protocols for Computer Communications; Aug. 2001 (12 pages).

B. Zhao, et al.; "Tapestry: A Resilient Global-Scale Overlay for Service Deployment"; IEEE Journal on Selected Areas in Communications; Jan. 2004 (15 pages).

A. Rowstron, et al.; "Pastry: Scalable, Decentralized Object Location and Routing for Large-Scale Peer-to-Peer Systems"; Lecture Notes in Computer Science; 2001 (22 pages).

C. Greg Plaxton, et al.; "Accessing Nearby Copies of Replicated Objects in a Distributed Environment"; ACM Symposium on Parallel Algorithms and Architectures; Jun. 1997 (23 pages).

M. Castro, et al.; "Practical Byzantine Fault Tolerance"; Symposium on Operating Systems Design and Implementation; Feb. 1999 (14 pages).

D. B. Terry, et al.; "Managing Update Conflicts in Bayou, a Weakly Connected Replicated Storage System"; Proceedings of the Fifteenth ACM Symposium on Operating Systems Principles; Dec. 1995 (12 pages).

D. Boneh, et al.; "Efficient Generation of Shared RSA Keys"; Journal of the ACM; 2001 (21 pages).

Y. Frankel, et al.; "Robust Efficient Distributed RSA-Key Generation"; Proc. $30^{th}$ Annual ACM Symposium on Theory of Computing (STOC); May 1998 (10 pages).

* cited by examiner

METHOD FOR SERIALIZER MAINTENANCE AND COALESCING

CROSS-REFERENCE TO RELATED APPLICATIONS

This application claims benefit under 35 U.S.C. § 119(e) from Provisional Application No. 60/617,912 entitled "Maintaining Object Ordering in a Shared P2P Storage Environment" filed on Oct. 12, 2004.

BACKGROUND

In recent years, a number of distributed storage system have been developed, commonly in the context of peer-to-peer (P2P) systems. The first generation of such P2P systems, e.g., Napster, Gnutella, etc., were "read-only" systems suitable for file sharing. These first generation systems typically placed less emphasis on availability and reliability of data and more emphasis on connectivity and name management (i.e., organization of files in directories, search mechanisms, etc.).

Modern P2P storage systems have evolved to provide solutions to a variety of storage problems. For example, recent approaches to P2P storage systems provide more extensive security, file sharing, and archive capabilities. Modern P2P storage systems are typically classified as archival-only systems or continuous-update systems. Archival-only systems (e.g., Venti, Freenet, etc.) assume that each object (e.g., piece of data, group of data, etc.) stored by the P2P storage system is unique and not dependent on any other object stored in the system. The archival-only systems typically provide mechanisms to reliably and securely store and retrieve objects. Further, archival-only systems are typically designed to work properly under disrupted or intermittent connectivity as long as unique object names can be created, new objects can be created and stored, and all objects can be retrieved subject to the connectivity constraints.

On the other hand, continuous-update systems (e.g., Oceanstore, FarSite, etc.) provide the ability to handle shared write operations and to maintain some relation between stored objects, in addition to the functionalities provided by archival-only systems. Further, continuous-update systems typically assume that data (in the form of objects) stored in the system may be updateable. Continuous-update systems typically maintain "the latest version" of an object. In this case, because object updates may originate simultaneously from multiple sources, a continuous-update system includes functionality to implement a serializer function. The serializer function is responsible for enforcing strict ordering of updates and may be implemented in many ways (i.e., centralized serializer, distributed serializer, etc.). Typically, continuous-update systems that support shared writes require additional mechanisms to maintain data integrity under intermittent connectivity.

Both archival-only and continuous-update systems rely on a distributed object location and retrieval (DOLR) mechanism (e.g., Tapestry [see, for example, Tapestry: An Infrastructure for Fault-tolerant Wide-area Location and Routing (2001)], Chord, etc.). Systems which use DOLR implement an overlay network on top of the basic Internet Protocol network, and use a naming and routing scheme, typically distributed hash tables (DHT), to communicate. Systems employing the DOLR mechanism are typically very sensitive to the availability and connectivity of the underlying communication infrastructure. In some cases, failures of critical devices (e.g., nodes, the serializer, etc.) and physical storage that is occasionally disconnected from the network may not allow systems using the DOLR mechanism to operate correctly (i.e., provide access to objects).

SUMMARY

In general, in one aspect, the invention relates to a method for serializer maintenance and coalescing in a distributed object store (DOS) comprising a first partition and a second partition, comprising requesting an update of an object, wherein the object comprises an active globally unique identifier (AGUID) object and at least one version globally unique identifier (VGUID) object, wherein the least one VGUID object comprises a first generation number and a first serializer name, determining whether a first serializer is located in the first partition using the first serializer name, wherein the first serializer is associated with the first generation number, if the first serializer is not located in the first partition constructing a second serializer using the first serializer name, assigning a second generation number to the second serializer, obtaining an order of the update to the object using the second serializer, and creating a new VGUID object, wherein the new VGUID object comprises a new version number, the second generation number, and the first serializer name.

In general, in one aspect, the invention relates to a system for serializer maintenance and coalescing in a distributed object store (DOS) comprising a first partition and a second partition, comprising an object in the first partition comprising an AGUID object and at least one VGUID object, wherein the object is configured to be updated with a first new VGUID object, a copy of the object in the second partition comprising a copy of the AGUID and the at least one VGUID object, a first serializer configured to determine an order of the first new VGUID object, wherein the first serializer is identified by a globally unique identifier (GUID) and associated with a first generation number, and a first root node in the second partition configured to create a second serializer in the second partition, wherein the second serializer is identified by the GUID and associated with a second generation number.

In general, in one aspect, the invention relates to a computer readable medium for serializer maintenance and coalescing in a distributed object store (DOS) comprising a first partition and a second partition, comprising software instructions to request an update of an object, wherein the object comprises an active globally unique identifier (AGUID) object and at least one version globally unique identifier (VGUID) object, wherein the least one VGUID object comprises a first generation number and a first serializer name, determine whether a first serializer is located in the first partition using the first serializer name, wherein the first serializer is associated with the first generation number, if the first serializer is not located in the first partition construct a second serializer using the first serializer name, assign a second generation number to the second serializer, obtain an order of the update to the object using the second serializer, and create a new VGUID object, wherein the new VGUID object comprises a new version number, the second generation number, and the first serializer name.

Other aspects of the invention will be apparent from the following description and the appended claims.

DETAILED DESCRIPTION

Figure 1:
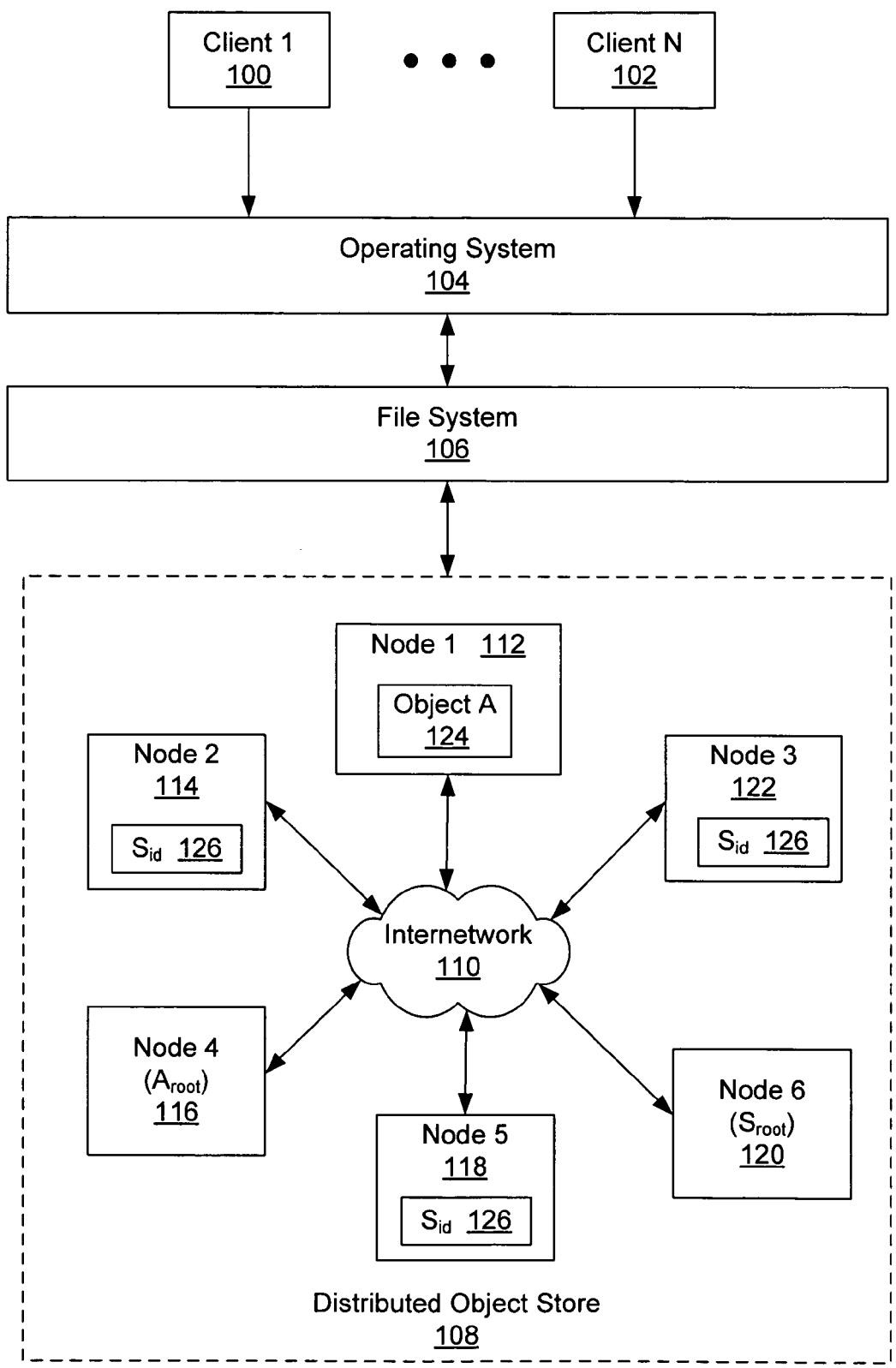
FIG. 1 shows a system in accordance with one embodiment of the invention.

Exemplary embodiments of the invention will be described with reference to the accompanying drawings. Like elements in the various figures are denoted by like reference numerals for consistency. Further, the use of "ST" in the drawings is equivalent to the use of "Step" in the detailed description below.

In the following detailed description of the invention, numerous specific details are set forth in order to provide a more thorough understanding of the invention. In other instances, well-known features have not been described in detail to avoid obscuring the invention.

In general, embodiments of the invention relate to maintaining the existence of multiple serializers in a partitioned distributed object store. Specifically, embodiments of the invention relate to creating new serializers in partitions that do not include a serializer. Further, embodiments of the invention relate to coalescing multiple serializers in the event of a reunification of the distributed object store.

FIG. 1 shows a system in accordance with one embodiment of the invention. The system includes one or more clients (i.e., Client 1 (100), Client N (102)) operatively connected to an operating system (104). The operating system (104) in turn is operatively connected to a file system (106), which is operatively connected to a distributed object store (DOS) (108). The operating system (104) typically provides clients (100, 102) with interfaces for opening, closing, editing, etc., files stored in the file system (106). The files, stored in the file system (106), contain data that is stored in the form of objects in the DOS (108). In one embodiment of the invention, an object is a collection of data that is capable of being modified (i.e., updated) and read by clients (e.g., Client 1 (100), Client N (102)) (as described in FIG. 2 below).

In one embodiment of the invention, the file system (106) includes functionality to resolve file names associated with the file system (106) to object identifiers (i.e., globally unique identifiers (GUIDs)) associated with objects stored in the DOS (108). In addition to associating objects with GUIDs, in one embodiment of the invention, other elements (e.g., nodes, etc.) within the DOS (108) are identified using a GUID. In one embodiment of the invention, the GUID is a location independent handle that is used to reference individual elements within the DOS (108). In one embodiment of the invention, all GUIDs for elements within the DOS (108) are obtained from the same namespace. In one embodiment of the invention, the GUID may be generated using a hash of the public key and the file name corresponding to the entity for which a GUID is being assigned. GUIDs are communicated by the file system (106) to the DOS (108) via an interface.

In one embodiment of the invention, GUIDs communicated to the DOS (108) are subsequently used to call lower-level interfaces that retrieve elements corresponding to the GUID. In this manner, a client's (e.g., Client 1 (100), Client N (102)) request (including a file name) may be serviced by the DOS (108) using a GUID to locate and provide access to an object containing the data requested by the client (e.g., Client 1 (100), Client N (102)). In one embodiment of the invention, the interface between the file system (106) and the DOS (108) allows simple commands to be communicated, such as a command to retrieve a file, update a file, delete a file, etc.

In one embodiment of the invention, the DOS (108) is a mutable object store (i.e., the DOS (108) includes read and write capabilities) with storage capacity (e.g., physical disks, etc.) and multiple nodes (e.g., Node 1 (112), Node 2 (114), Node 3 (122), Node 4 (116), Node 5 (118), Node 6 (120)), where each node (e.g., Node 1 (112), Node 2 (114), Node 3 (122), Node 4 (116), Node 5 (118), Node 6 (120)) may also include its own local storage capacity. Further, some nodes within the DOS (108) may be used for object storage, while other nodes may be used for message passing, management, etc. For example, Node 1 (112) in FIG. 1 is shown as storing object A (124), where object A (124) is identified by the GUID $A_{obj}$ (not shown). Further, all the nodes (e.g., Node 1 (112), Node 2 (114), Node 3 (122), Node 4 (116), Node 5 (118), Node 6 (120)) in the DOS communicate using a inter-network (110). In one embodiment of the invention, the inter-network (110) of the DOS (108) is organized using distributed hash tables (DHT). DHT provides the information look-up service for the DOS. Thus, communication and routing of messages, objects, update requests, etc. between nodes within the DOS (108) is handled using DHT. Further, each node in the DOS (108) is capable of locating and retrieving objects via their respective GUIDs.

Figure 2:
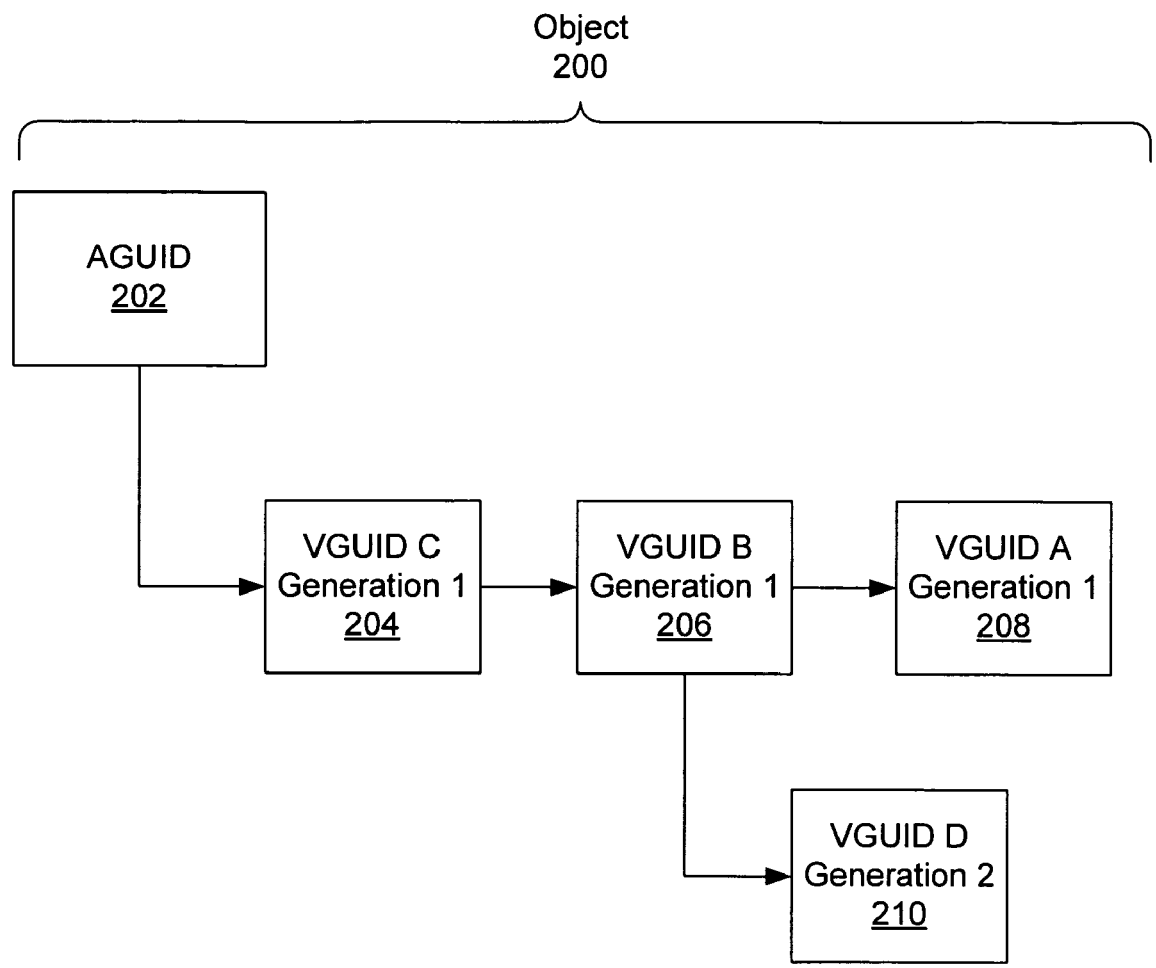
FIG. 2 shows an object in accordance with one embodiment of the invention.

As described above, the DOS (108) stores data in the form of objects. FIG. 2 shows an object (200) in accordance with one embodiment of the invention. As defined in the present invention, the object (200) is actually made up of a group of objects. Specifically, in one embodiment of the invention, an object includes an active GUID (AGUID) object and one or more version GUID (VGUID) objects. The AGUID object is used to identify the object as a whole (including updates), and each VGUID object represents a particular version (i.e., an update) of the object (200). In one embodiment of the invention, the AGUID object contains the name of the object, and is identified using the GUID of the object. Further, in one embodiment of the invention, as an object is updated, the content of the AGUID object associated with the object is modified to reference the new VGUID object that is added to the object as a result of the update made to the object. In contrast, the content of the previous latest VGUID object (i.e., the previous "latest version" of the object) is not modified when an object is updated. Rather, the new VGUID object references the previous VGUID object.

In contrast, a particular VGUID object associated with an object has its own GUID that is different from the GUID of the object. To illustrate the relationship between an object, an AGUID object, and one or more VGUID objects, consider the object (200) shown in FIG. 2. The object (200) includes an AGUID object (202), and several VGUID objects (i.e., VGUID A (208), VGUID B (206), VGUID C (204)). Initially, when the object is created, the data stored in the object is stored in a VGUID object, and an AGUID object is created to reference the VGUID object and provide metadata associated with the object. For example, using the object (200) shown in FIG. 2, storing data in the DOS initiates the creation of the AGUID object (202) and one VGUID object (i.e., VGUID C (204)). In one embodiment of the invention, the AGUID object (202) includes information regarding the serializer (discussed below) associated with the object (200), the GUID of the object (200), a pointer to the most recent VGUID object, and other metadata associated with the object (200), such as version numbers and generation numbers (discussed below).

Upon creation of the object (200), the object (200) may be updated at various times by clients using the DOS. In one embodiment of the invention, each new version of the object (200) is identified by its own VGUID object (i.e., VGUID A (208), VGUID B (206), VGUID C (204)). More specifically, as the object (200) is updated, additional VGUID objects (i.e., VGUID A (208), VGUID B (206), VGUID C (204)) are created and added to the object (200). In one embodiment of the invention, each new VGUID object (i.e., VGUID A (208), VGUID B (206), VGUID C (204)) is linked to previous VGUID object(s) (i.e., VGUID A (208), VGUID B (206), VGUID C (204)) of the object (200) using back pointers, forming a chain of versions of the object (200). Specifically, each VGUID object includes two back pointers, i.e., one that references the latest previous VGUID object, and one that references the VGUID object upon which the update to the object is based. The most recent VGUID object (i.e., VGUID A (208) in FIG. 2) added to the chain represents the "latest version" of the object (200), and includes the most recent updates made to the object (200). Further, each VGUID object (i.e., VGUID A (208), VGUID B (206), VGUID C (204)) includes a pointer to a data structure (not shown) through which the data of that version of the object (200) may be retrieved.

In one embodiment of the invention, each VGUID object (i.e., VGUID A (208), VGUID B (206), VGUID C (204)) includes information such as the version number for that particular version of the object (200), the previous version number associated with the previous VGUID object, the identity of the updating node, signatures and keying material, information identifying the AGUID object (202), etc. In one embodiment of the invention, each VGUID object (i.e., VGUID A (208), VGUID B (206), VGUID C (204)) also includes a generation number corresponding to the serializer (discussed below) associated with the object (200).

Continuing with FIG. 2, in one embodiment of the invention, the first version (i.e., the first VGUID object created) of a new generation of an object (200) is linked to some version of a previous generation from which it follows. As shown in FIG. 2, VGUID D (210) of generation two is linked to VGUID B (206) of generation one. In one embodiment of the invention, the presence of different generation numbers associated with VGUID objects indicates that a partition in the DOS occurred, and independent object evolutions of the object (200) are maintained in each partition. In one embodiment of the invention, although VGUID B (206) and VGUID D (210) are different VGUID objects, the same version number may be assigned to each, where different generation numbers distinguish the different VGUID objects with the same version number. In one embodiment of the invention, the chain of VGUID objects are linked in a manner that allows any previous VGUID object in any previous or current generation to be obtained. Those skilled in the art will appreciate that version numbers assigned to VGUID objects may increase monotonically across generations or be reset for each new generation number.

Those skilled in the art will appreciate that the use of the term "object" throughout this application refers to an object such as that depicted using reference number 200 in FIG. 2. Specifically, the term "object" refers to the entire chain of the object, including the AGUID object, one or more VGUID objects, and the actual data contained in the object.

Returning to FIG. 1, in one embodiment of the invention, for any object in the DOS (108), a root node associated with the object exists. The root node of the object is responsible for tracking the location of the object at all times. FIG. 1 shows the root node of object A (124) as Node 4 (116), where Node 4 (116) is denoted as $A_{root}$ (i.e., the root of object A (124)) for purposes of illustration. Thus, Node 4 (116) is responsible for maintaining information regarding the location of object A (124) and providing requesting nodes with the address of one or more nodes that store object A (124). In one embodiment of the invention, if the root node of an object fails, is disconnected from the internetwork (110), or is otherwise unable to function, another node within the DOS (108) automatically becomes the root node for the object. The assigning of root nodes is implemented based on the GUID of the object and the GUIDs of nodes actively operating in the DOS (108). Specifically, the node that has a GUID that is closest to the GUID of the object (i.e., closest lower in namespace to the GUID of the object) is assigned as the root node of the object. For example, if an object's GUID is 1000, then a node with a lower GUID in closest proximity to 1000, for example 900, is assigned the root node of the object. Thus, if the root node of an object fails or is somehow disconnected from the internetwork (110), a new node, which has a GUID that is closest to the GUID of the object, is assigned as the root node of the object.

Further, in one embodiment of the invention, each object (i.e., each composite object represented by the AGUID object) is associated with a serializer. In one embodiment of the invention, the serializer is a function that is responsible for ordering the updates made to an object and assigning a version number to each VGUID object added to an object. In one embodiment of the invention, the serializer is made up of multiple nodes, each of which include the same serializer object associated with the particular serializer. Similar to other elements in the DOS, the serializer object is identified using a GUID. The GUID associated with a given serializer object is stored in each serializer object associated with the particular serializer. Thus, for a given serializer, each node that is part of the serializer (i.e., a member of the serializer) includes the same serializer object. As shown in FIG. 1, Node 2 (114), Node 3 (122), and Node 5 (118) each include the serializer object $S_{id}$ (126), and are thus members of the same serializer. Further, $S_{id}$ (126) is the serializer for object A (124) in FIG. 1. Those skilled in the art will appreciate that one serializer may be responsible for multiple objects, but each object is associated with only one serializer. Those skilled in the art will also appreciate that a particular node may be a member of more than one serializer. Further, those skilled in the art will appreciate that a serializer may include only one member (i.e., one node may form a serializer).

In one embodiment of the invention, each serializer is associated with a generation number. The generation number is used to track major events in the DOS (108). In one embodiment of the invention, a major event in the DOS (108) may correspond, but is not limited to, one of the following: (i) partitioning of the DOS (108), (ii) reuniting of a partitioned DOS (108), etc. Partitioning of the DOS (108) occurs when the DOS (108) splits into two or more partitions such that each partition operates independently. Partitioning of the DOS (108) may occur, for example, when connectivity in portions of the DOS (108) is broken, the underlying network is disconnected at certain points, etc. Thus, no element in one partition may access any element in another partition. In contrast, uniting of a partitioned DOS (108) occurs when the underlying network connectivity issues are resolved and the individual partitions of the DOS (108) rejoin as part of the original internetwork (110).

Thus, when a partition or reunification of the DOS (108) occurs, the generation number is updated to reflect the changes invoked by these major events. In one embodiment of the invention, every generation (i.e., time period in which the DOS (108) does not undergo a major event) of a serializer is identified by a unique generation number. Further, multiple serializers are also identified by unique generation numbers. Thus, each serializer present in a partition during a generation is associated with a unique generation number. Further, all the VGUID objects created during the same generation are associated with the same unique generation number. In one embodiment of the invention, the generation number may be a random value based on the GUIDs of the nodes that are members of a particular serializer at a particular point in time (i.e., at the time when the generation number is derived). Because the generation number is based on the GUIDs of the nodes that form the serializer, when the DOS (108) is partitioned, each of the partitions choose a different generation number. Alternatively, in one embodiment of the invention, the generation number may be the hash of a generation-specific public key.

In one embodiment of the invention, each member of a serializer also includes a list of the GUIDs of the other members of the serializer. Using this list of GUIDs, each member of a particular serializer may communicate with one another using the internetwork (110) of the DOS (108). The members that make up the serializer may use the communication capability to vote on the order of updates for an object (i.e., the order of new VGUID objects (discussed below in FIG. 4)). Additionally, in one embodiment of the invention, each member of a particular serializer includes a share of (i.e., a portion of) a private key associated with the serializer. The private key is divided into shares in a manner that allows the complete private key to be regenerated if more than half of the shares of the private key are present. Thus, if at least half of the members of a particular serializer are functioning, an object update can be completed and signed by the serializer. In one embodiment of the invention, the private key is used to sign operations performed by the serializer. Alternatively, in one embodiment of the invention, the private key associated with the serializer may never be reconstructed. Rather, the signature operation itself is a distributed algorithm, where at least a fraction (i.e., ⅔) of the nodes in the serializer need to participate. Thus, the signature may be calculated without exposing the private key to any single entity.

Further, in one embodiment of the invention, each member of the serializer periodically publishes the possession of the serializer object using a publishing function. For example, in FIG. 1, Node 2 (114), Node 3 (122), and Node 5 (118) periodically publish possession of the serializer object $S_{id}$ (126). Thus, the serializer object is highly publicized within the DOS. In one embodiment of the invention, the publishing function may also be used to signal that a new serializer needs to be constructed in a partition when the DOS (108) splits into more than one partition (discussed below).

Similar to other elements within the DOS (108), the serializer is associated with a root node that tracks the location of the serializer object. In FIG. 1, the root node for the serializer object is Node 6 (120), where Node 6 (120) is denoted as $S_{root}$ (i.e., the root of the serializer object $S_{id}$ (126)) for purposes of illustration. In one embodiment of the invention, the root node of the serializer object includes functionality to locate at least one member of a serializer. For example, Node 6 (120) includes functionality to locate at least one member of the particular serializer identified by the serializer object $S_{id}$ (126). Once one member of the serializer is located, that member is capable of communicating with the other members of the serializer.

Figure 3:
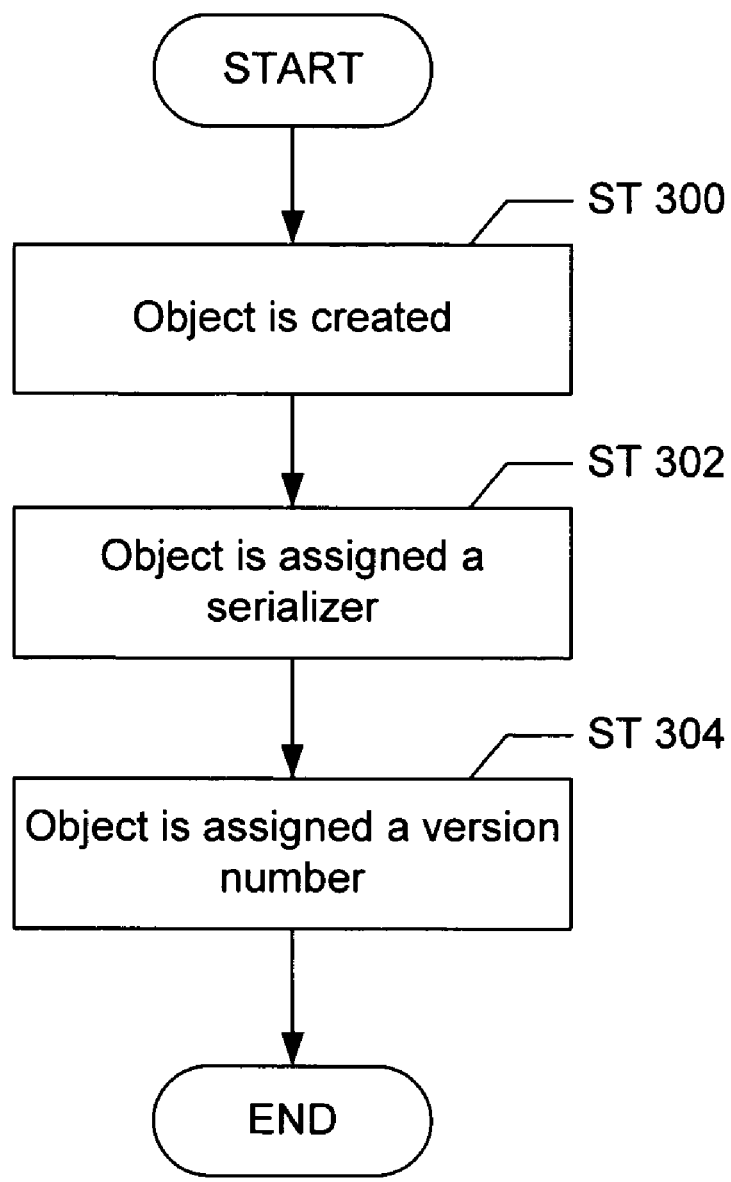
FIG. 3 shows a flow chart for creating an object in accordance with one embodiment of the invention.

FIG. 3 shows a flow chart for creating an object in accordance with one embodiment of the invention. Initially, an object is created when a client requests some data to be stored in the DOS (Step 300). Specifically, the creation of an object includes the creation of an AGUID object that contains the GUID of the object, and one VGUID object that contains the data to be stored. Subsequently, the object is assigned a serializer (Step 302). As noted above, the GUID of the serializer object is stored in the AGUID object. Additionally, when the VGUID object is created, the VGUID object is associated with a version number based on some convention (Step 304). For example, the DOS may use the convention that the first version number is one. Those skilled in the art will appreciate that other conventions to assign the first version of a newly created object may be used as well.

Figure 4:
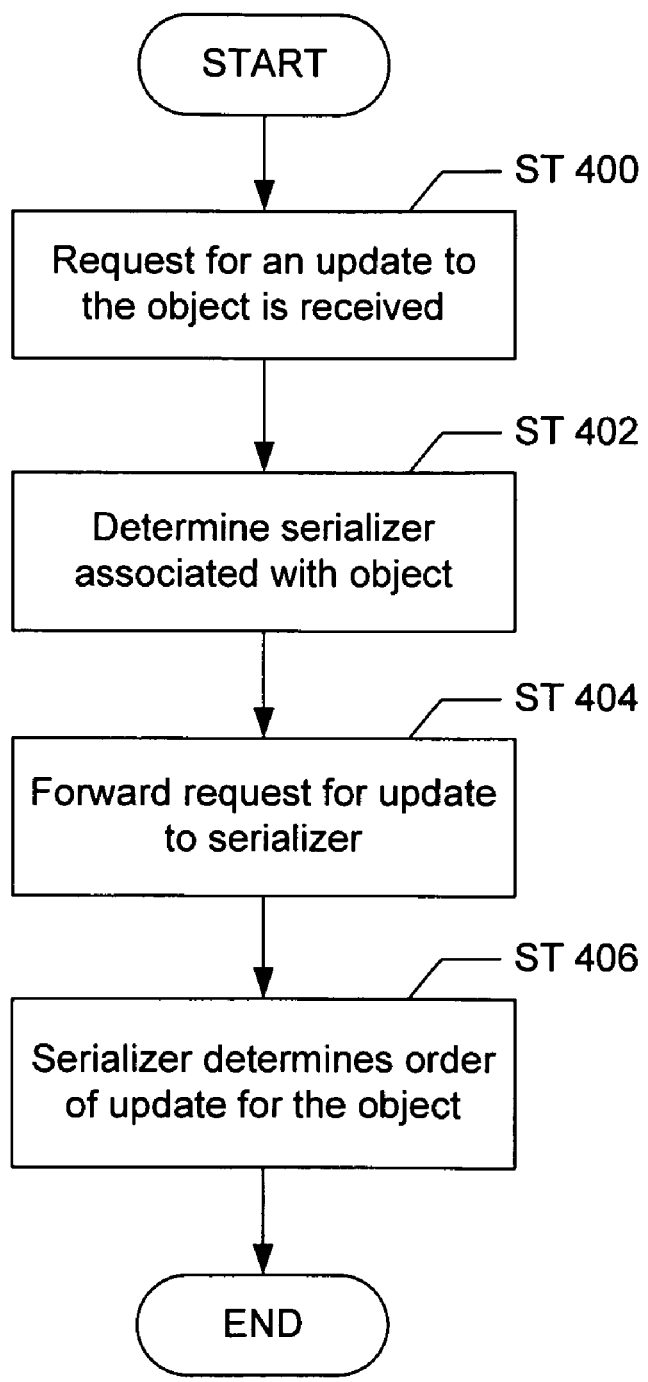
FIG. 4 shows a flow chart for updating an object in accordance with one embodiment of the invention.

FIG. 4 shows a flow chart for updating an object in accordance with one embodiment of the invention. Initially, a request to update an object is received from a client using the DOS (Step 400). In one embodiment of the invention, the update request may include the AGUID object (or a pointer to the AGUID object) associated with the object to be updated, a signature of the client, and the data required to update the object. As noted above, the AGUID object includes the GUID of a corresponding serializer object. Using this information, the node that receives the request to update the object determines which serializer is responsible for the object (Step 402) and forwards the request for an update to the object to the corresponding serializer (Step 404). In one embodiment of the invention, the node forwards both the GUID of the object and a VGUID object template to the serializer. Specifically, the node receiving the update request generates the VGUID object template, completes part of the VGUID object template corresponding to the data given by the client (i.e., pointers to the update data, the node's signature, etc.), and forwards the partially completed VGUID object template to the serializer object (i.e., using the GUID of the serializer object). In one embodiment of the invention, the GUID of the serializer object is used as the destination address of the message (i.e., update request) sent by the node. The message is navigated through the DOS and is deflected toward the first member of the serializer that is encountered. Upon receiving the message, the serializer subsequently determines the order of the update to the object (Step 406), completes the remaining areas of the VGUID object template, and forwards the VGUID object template back to the node that sent the message. In one embodiment of the invention, the node that sends the message to the serializer is responsible for storing the new VGUID object (i.e., committing the object to memory) in the DOS once the order of the update is determined by the serializer.

In one embodiment of the invention, the serializer determines the order of updates for an object by having each member of the serializer vote on the order of updates made to an object. For example, if several updates are made to an object within the same time span, then the serializer must determine in which order the object is updated. In one embodiment of the invention, the voting is resolved using a Byzantine Agreement (See, *Cyclopedia Cryptologia*, "Byzantine Agreement," Ray Dillinger (2001-2003)). Further, when the order of updates is agreed upon by the members of the serializer, the serializer populates the VGUID object template(s) provided with the object to be updated based on the order. More specifically, the VGUID object template is populated with the new version number, the generation number, etc. Subsequently, the VGUID object is added to the object chain (i.e., the VGUID object is linked to the previous VGUID object that represented the previous version of the object). Upon linking the latest VGUID object to the previous latest VGUID object, in one embodiment of the invention, the populated VGUID object template is digitally signed by the serializer. The AGUID object is then modified to reference the new VGUID object, and the modified AGUID object is stored by the serializer. The serializer then sends the updated object back to the node that sent the request for a new version of the object.

Further, although not shown in FIG. 4, in one embodiment of the invention, the node that receives the request to update the object stores the updated object using erasure coding. Erasure coding involves storing multiple copies of the updated object, where the updated object is fragmented into m fragments, and recoded into n fragments, with n being larger than m. Using erasure coding, the updated object can be reconstructed with any m fragments. In one embodiment of the invention, the ratio of m/n used to store the updated object is 16/64. Thus, the updated object is fragmented into 16 fragments, and then recoded into 64 fragments. These 64 fragments are subsequently stored by the node on various other nodes within the DOS. Thus, the object may be reconstructed using any 16 of the 64 fragments that are stored in the DOS. This method is used to ensure reliability of data so that when the DOS partitions, at least one copy of the object may be reconstructed in any partition. Those skilled in the art will appreciate that other methods may be used to store multiple copies of the update object, e.g., the DOS may simply store n copies of the updated object.

In one embodiment of the invention, multiple copies of the latest VGUID object are stored in the DOS, and each copy that is stored points to the previous VGUID objects associated with the object. However, copy-on-write allows the previous copies of the old object chain (i.e., the previous chain of VGUID objects that represented the object before the latest update) to remain the same (i.e., previous copies of the old object chain are not updated with the latest version of the object).

Figure 5:
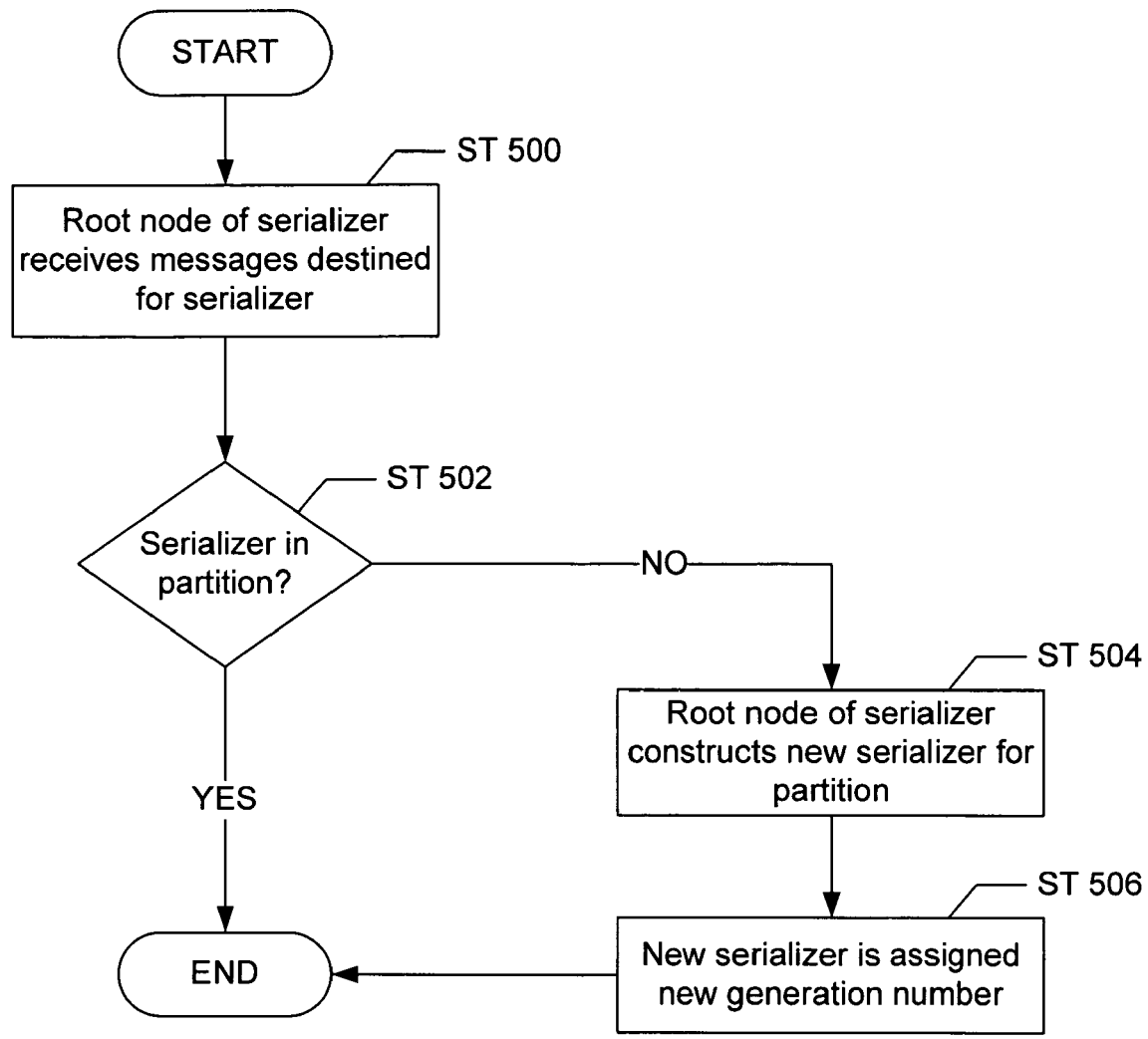
FIG. 5 shows a flow chart for maintenance of a serializer in a partition in accordance with one embodiment of the invention.

FIG. 5 shows a flow chart for managing independent object evolutions when the DOS is partitioned in accordance with one embodiment of the invention. Initially, the root node of the serializer object receives messages destined for the serializer (Step 500). In one embodiment of the invention, the root of the serializer is capable of recognizing a partition in the DOS. When a message is forwarded by a node to the serializer, and the serializer cannot be located (i.e., the message is not deflected to a member of the serializer), the message eventually reaches the root node of the serializer, which is responsible for locating the serializer. Therefore, when a partition occurs in the DOS, and an update request for an object is sent to the object's serializer, the message reaches the root of the serializer object (i.e., the root of the serializer GUID). At this stage, the root of the serializer attempts to locate the serializer in the partition. If the serializer is found in the partition (Step 502), then a new version number is assigned to a new VGUID object and the object is updated as described and shown above in FIG. 4. In one embodiment of the invention, in order to determine whether the serializer exists in the partition, two-thirds of the nodes that include the serializer object must be located in the partition. Alternatively, if less than two-thirds of the nodes that are members of the serializer reside in the partition, then the serializer does not exist in the partition. Those skilled in the art will appreciate that determining whether the serializer exists in the partition may require any number of members of the serializer to exist in the partition. For example, half of the members of a serializer may be required to reside in the partition, or a single member of a serializer may be required to reside in the partition.

If the serializer is not found in the partition (Step 502), then the root of the serializer constructs a new serializer for the partition (Step 504). In one embodiment of the invention, the new serializer is constructed with the same GUID (i.e., the serializer object name is the same as the previous serializer); however, the members of the serializer (i.e., the nodes that include the serializer object) may be different. In one embodiment of the invention, the root of the serializer locates at least one member of the old serializer in the partition, and that member is used to initiate the inclusion of other nodes to form the new serializer. Specifically, a member of a serializer is capable of electing addition members to provide serializer functionality by providing the elected new member with their share of the private key held by all the serializer members. Further, the member of the old serializer contains the serializer object, which is subsequently copied to the new members of the serializer. Because the serializer object is highly publicized, at least one copy of the serializer object is found in each partition of the DOS.

Continuing with FIG. 5, in one embodiment of the invention, the new serializer is assigned a new generation number to track that the serializer is operating after a major event in the DOS (i.e., the partitioning of the DOS) (Step 506). At this stage, the new serializer determines the order of the new VGUID object (where the new VGUID object also includes the new generation number) as described with respect to FIG. 4. Those skilled in the art will appreciate that when the DOS partitions, a copy of the object always exists in each partition because when the object is stored, multiple copies of the object are also stored on various nodes within the DOS.

As a result of the process shown in FIG. 5, the DOS is able to maintain multiple serializers under different generation numbers operating individually in different partitions. However, when the DOS reunites, only one generation of a particular serializer may operate in the reunited DOS. In one embodiment of the invention, when the DOS reunites, the individual serializers operating in partitions prior to the reunification are coalesced into one serializer for the reunited DOS.

Figure 6:
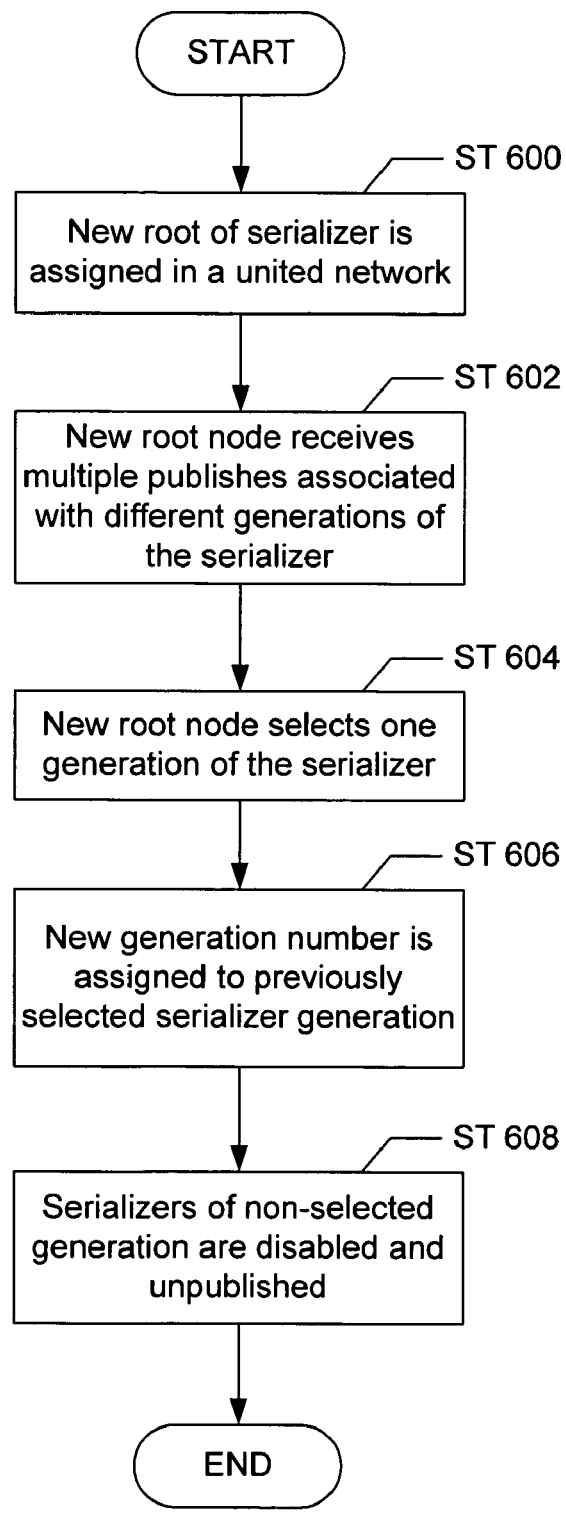
FIG. 6 shows a flow chart for the coalescing of a serializer in accordance with one embodiment of the invention.

FIG. 6 shows a flow chart for coalescing multiple serializers in accordance with one embodiment of the invention. Initially, when a partitioned DOS reunites (i.e., the partitions come together to form one united DOS), a new root node for the serializer object that has a GUID closest to the GUID of the serializer object is assigned (as described above in FIG. 1) (Step 600). In one embodiment of the invention, the new root node may be chosen from the set of nodes that functioned as a root node for the serializer object in individual partitions. Subsequently, the new root node for the serializer object receives publishing messages from multiple serializers with different generation numbers (Step 602). This process occurs because each serializer publishes its own serializer GUID, which includes the generation number. As such, once the new root node for the serializer object acknowledges receipt of messages associated with multiple generations of the same serializer, the new root node for the serializer object disables all but one generation of the particular serializer (Step 604).

In one embodiment of the invention, in order to determine which generation of the serializer is disabled, the root node may inform one member of each serializer about the presence of the other serializer (e.g., by transmitting the address of one member of one of the serializers, etc.). Subsequently, the two serializers get communicate with each other, prove to each other that they have the same Serializer ID (e.g., by signing a challenge from the other serializer), and then elect the serializer that should survive. In one embodiment of the invention, the surviving serializer may be the one with the lower generation number. Finally, the non-selected serializer transmits some state information to the surviving serializer, and is subsequently disabled. Optionally, some of the members of the disabled serializer may become members of the surviving serializer (i.e., if members of the disabled serializer are high performing or preferable by some other criteria).

At this stage, a new generation number is assigned to the remaining serializer to track that the remaining serializer is operating in the reunited DOS (Step 606). In one embodiment of the invention, the new generation number is assigned by the serializer itself. In one embodiment of the invention, the serializers that were not selected to operate in the united DOS are unpublished (i.e., a message is sent to the new root node that the disabled serializer(s) are no longer responsible for the object(s) previously handled by those serializers) (Step 608), and the process ends.

Those skilled in the art will appreciate that the moment in which a serializer is disabled and another serializer takes the place of the disabled serializers is the instant at which the DOS is reunited with respect to the objects handled by the coalesced serializers. Before the disabling of multiple serializers, multiple evolutions of objects in different partitions existed. Upon the disabling of all but one serializer, only one object evolution exists for each object handled by the coalesced serializer. Further, those skilled in the art will appreciate that there may be other serializers serving a different set of objects that are coalesced when partitions of the DOS reunite.

Figure 7A:
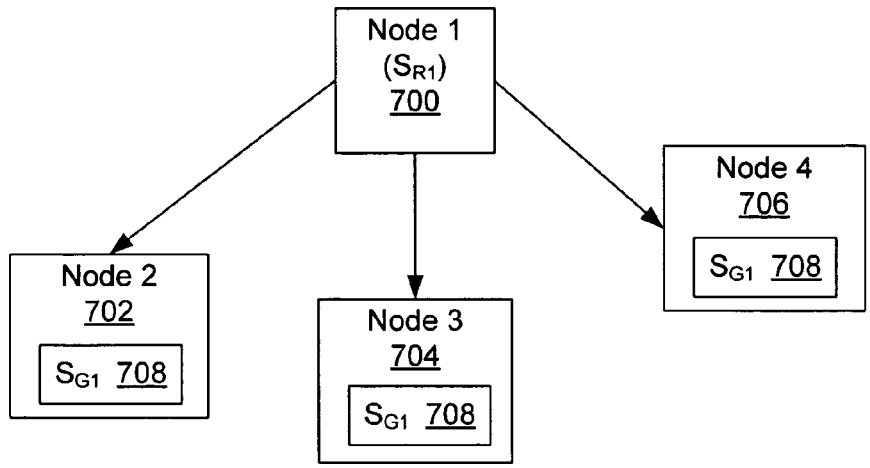
FIGS. 7A-7D show examples of serializer maintenance and coalescing in accordance with one embodiment of the invention.

FIGS. 7A-7D show examples of the different serializer states in a partitioned and reunited DOS in accordance with one embodiment of the invention. Specifically, the examples shown in FIGS. 7A-7D show the stages of a serializer when the DOS partitions and then later reunites. In this scenario, the DOS is initially intact as one entity (shown in FIG. 7A), and subsequently separates into two individual partitions (shown in FIG. 7B). Upon partitioning of the DOS, the creation of two individual serializers is shown. FIG. 7A shows a serializer including three serializer members (i.e., Node 2 (702), Node 3 (704), Node 4 (706)), where each serializer member includes the serializer object $S_{G1}$ (708). Further, FIG. 7A shows the root node of the serializer object, i.e., Node 1 (700), where Node 1 (700) is denoted as $S_{R1}$ to show that Node 1 (700) is the root node of the serializer object in generation one. The configuration shown in FIG. 7A represents a serializer in the DOS before any partitions or reunifications have occurred. Thus, the serializer shown in FIG. 7A corresponds to the first generation of serializers, denoted by the G1 (i.e., generation one) subscript of the serializer object. Those skilled in the art will appreciate that the serializer object $S_{G1}$ (708) is identified by the same GUID in each of the serializer members (i.e., Node 2 (702), Node 3 (704), Node 4 (706)).

Figure 7B:
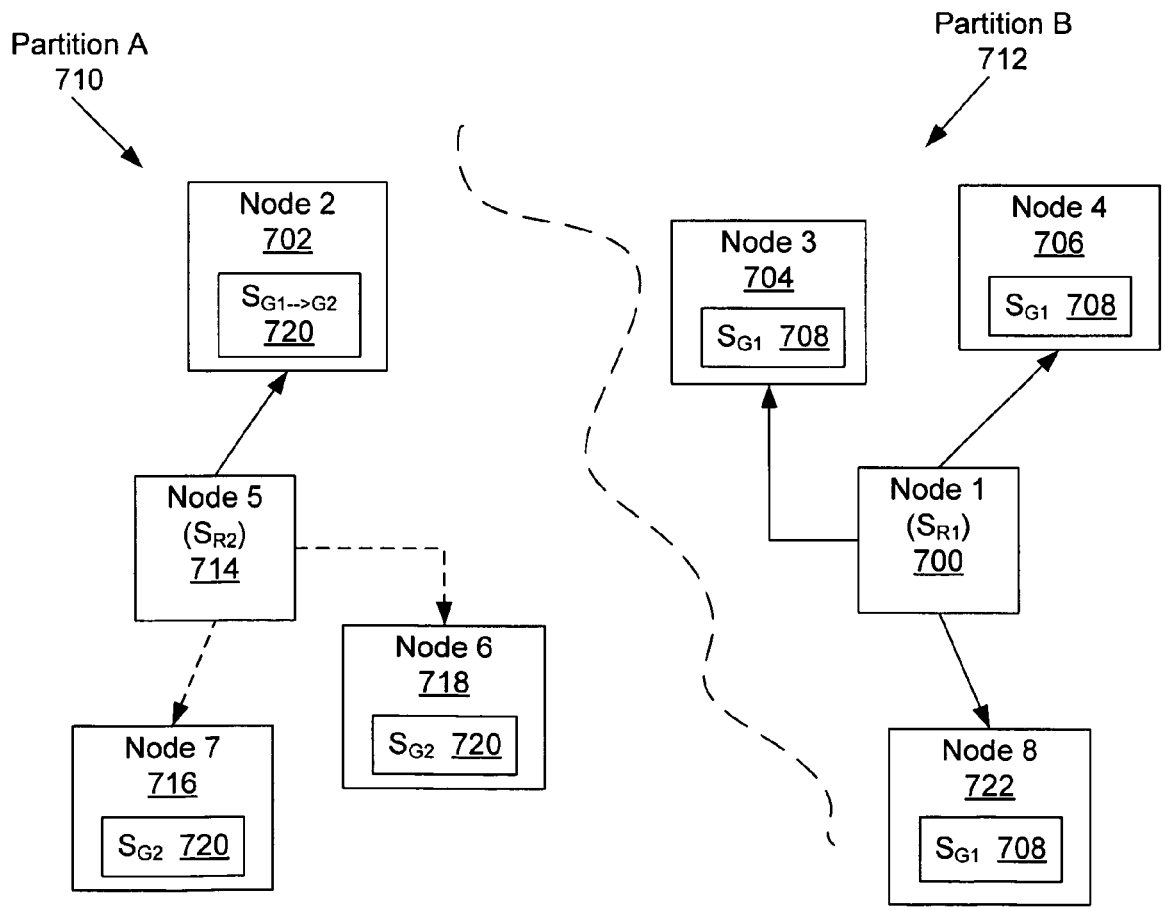

FIG. 7B shows a DOS partitioned into two individual partitions (Partition A (710), Partition B (712)). In this example, as shown by the configuration of the nodes in FIG. 7B, the DOS partitioned such that Node 1 (700), Node 3 (704), and Node 4 (706) are in Partition B (712), and Node 2 (702) is located in Partition A (710). Further, Partition B (712) includes the original root node (i.e., Node 1 (700)) of the serializer object and two of the three original serializer members (Node 3 (704) and Node 4 (706)). Thus, because two-thirds of the original serializer members exist in Partition B (712), the serializer identified by generation one (G1) resides in Partition B (712). Additionally, Node 1 (700), creates a new member (i.e., Node 8 (726)) of the serializer identified by generation one in Partition B (712) to replace the member that was lost when the DOS partitioned. Thus, Node 3 (704), Node 4 (706), and Node 8 (726) each include the serializer object SGI (708). Again, those skilled in the art will appreciate that there may be any arbitrary number of members required to exist in a partition in order to declare that a serializer exists in the partition.

In contrast, when the DOS partitioned in this example, Partition A (710) includes only one of the original serializer members (Node 2 (702)). When the partition occurs, Node 2 (702) publishes possession of $S_{G1}$ (708), and a new root node (i.e., Node 5 (714)) is assigned for the serializer object. As described above, Node 5 (714) is assigned as the root node of the serializer object based on the GUID of the serializer object and the GUID of Node 5 (714). Those skilled in the art will appreciate that the serializer associated with Partition A (710) may still be identified by the same GUID as the serializer associated with Partition B (712), however the serializer associated with Partition A (710) is assigned a new unique generation number. In this example, Node 5 (714) is denoted as $S_{R2}$, where the number two in the subscript represents the serializer object identified by generation two.

Continuing with FIG. 7B, when a request to update an object is sent to the serializer of Partition A (710), the update request may be received at the root node of the serializer object (i.e., Node 5 (714)). Node 5 (714) subsequently attempts to locate the members of the serializer within Partition A (710). If two-thirds of the members cannot be found in the partition, as in the case in this example, Node 5 (714) reconstructs the serializer using the serializer object $S_{G1}$ present in Partition A (710) by adding new members of the serializer within Partition A (710), where the new members include a serializer object $S_{G2}$ (720) identified by the same GUID, but a different generation number (i.e., G2). As shown in FIG. 7B, new members of the serializer in Partition A (710) are Node 6 (718) and Node 7 (716). Further, Node 6 (718) and Node 7 (716) include the serializer object $S_{G2}$, where $S_{G2}$ is identical in content to $S_{G1}$, except $S_{G2}$ includes the GUIDs of Node 2 (702), Node 6 (718), and Node 7 (716), and the new the generation number (G2). Further the serializer object located in Node 2 (702) is updated to reflect the new generation number assigned to Partition A (710), as shown by the transition of the serializer object included in Node 2 (702) from $S_{G1}$ to $S_{G2}$. Thus, two individual serializers operate separately in partition A (710) and partition B (712).

Figure 7C:
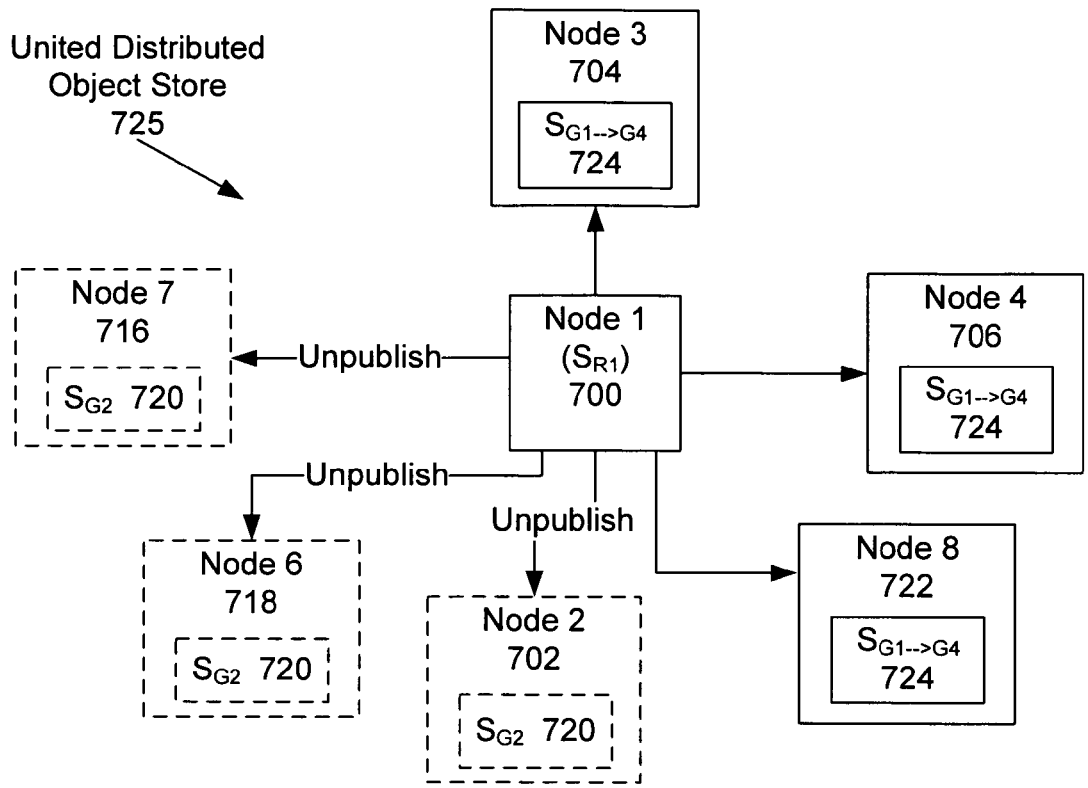

FIG. 7C shows a united DOS (725) in which the serializer coalescing process is initiated. As noted above, the root node that is assigned to be the root node for the serializer object in a reunited DOS is typically a node that operated as a root node for the serializer object in one of the partitions prior to the unification of the DOS. This is because of the manner in which a root node is assigned (i.e., the node closest in proximity to the GUID of the serializer object becomes the root node of the serializer object). In FIG. 7C, the root node for the serializer object is Node 1 (700), which was the root node of the serializer object in Partition B (712) in FIG. 7B. Those skilled in the art will appreciate that because Node 1 (700) is assigned as the root node of the serializer object, this implies that Node 1 (700) has a GUID closer to the serializer object GUID than Node 5 (714).

Continuing with FIG. 7C, once a single root node of the serializer object is assigned, root node of the serializer object selects a generation of serializer members to operate in the reunited DOS. For the purposes of this example, consider the scenario where the serializer with generation number one (G1) is selected by Node 1 (700). Subsequently, as indicated by the dashed outlines in FIG. 7C, the members of the serializer with a different generation number (i.e., Node 2 (702), Node 6 (718), Node 7 (716)) are disabled and unpublished by Node 1 (700), leaving only the serializer identified by generation one active. The serializer identified by generation one is then assigned a new generation number to signify that the serializer is operating in the reunited DOS (725). In FIG. 7C, the new generation number is denoted as G4, and the serializer objects associated with the serializer are updated to reflect the new generation number, as shown by the transition of the subscript of the serializer object from $S_{G1}$ to $S_{G4}$.

Figure 7D:
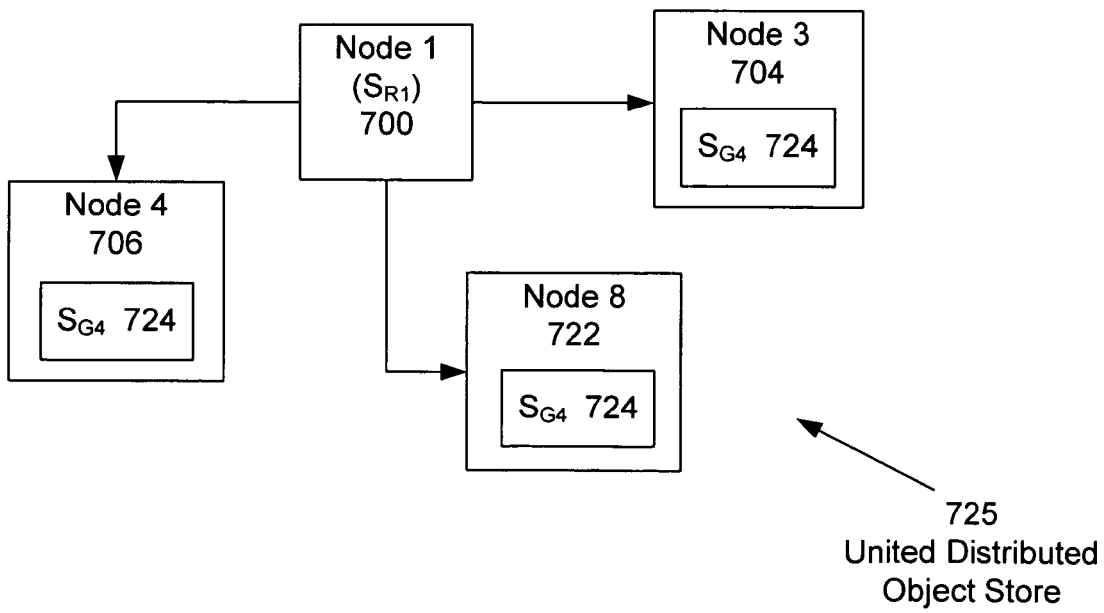

FIG. 7D shows the completed coalescing process in the reunited DOS (725). As shown, the disabled, unpublished serializer members do not exist in the reunited DOS, and a single serializer with three members (Node 3 (704), Node 4 (706), Node 8 (722)) under the same GUID is operating under the new generation number (G4). Further, one root node (i.e., Node 1 (700)) is assigned as the root node of the serializer object.

Those skilled in the art will appreciate that although FIGS. 7A-7D illustrate the creation and coalescing of a serializer with the same GUID, this process may occur for each of the serializers operating in the DOS. As a result of the process shown using the examples of FIGS. 7A-7D, the DOS is capable of maintaining multiple serializers in different partitions and coalescing multiple serializers when the DOS reunites. Throughout both of these processes, the generation number (Gn) is used to track the occurrence of the major events (i.e., partitioning and reuniting of the DOS).

Figure 8:
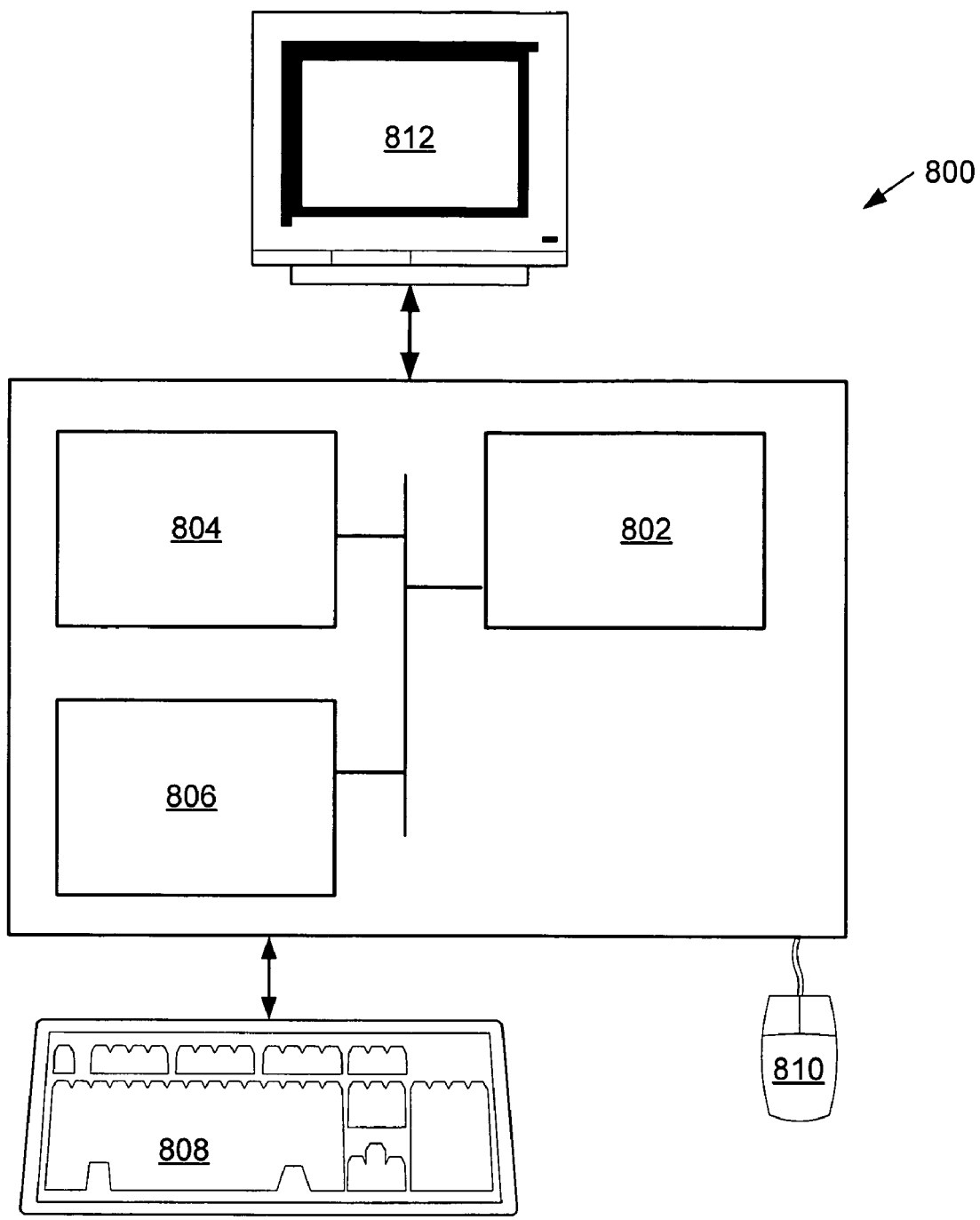
FIG. 8 shows a computer system in accordance with one embodiment of the invention.

One or more embodiments of the invention may be implemented on virtually any type of computer regardless of the platform being used. For example, as shown in FIG. 8, a networked computer system (800) includes a processor (802), associated memory (804), a storage device (806), and numerous other elements and functionalities typical of today's computers (not shown). The networked computer (800) may also include input means, such as a keyboard (808) and a mouse (810), and output means, such as a monitor (812). The networked computer system (800) is connected to a local area network (LAN) or a wide area network via a network interface connection (not shown). Those skilled in the art will appreciate that these input and output means may take other forms. Further, those skilled in the art will appreciate that one or more elements of the aforementioned computer (800) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for serializer maintenance and coalescing in a distributed object store (DOS) having a first partition and a second partition, comprising:
   receiving a request to update an object in the DOS, wherein the object comprises an active globally unique identifier (AGUID) object to identify the object and to identify a serializer object associated with the object, wherein the object further comprises a version globally unique identifier (VGUID) object referenced by a first pointer in the AGUID object, and wherein the VGUID object represents an update to the object and comprises a first generation number associated with the serializer object;
   counting a plurality of nodes storing the serializer object in the first partition to generate a count, wherein the count determines an existence of a first serializer in the first partition;
   constructing a second serializer based on the count by copying the serializer object to an additional node in the first partition;
   assigning a second generation number to the second serializer, wherein the second serializer comprises the plurality of nodes and the additional node after copying the serializer object;
   populating a new VGUID object comprising a new version number and the second generation number using the second serializer, wherein the new VGUID object further comprises a second pointer referencing the VGUID object;
   updating the first pointer of the AGUID to reference the new VGUID;
   storing the new VGUID object in a memory; and
   displaying the new VGUID object.

2. The method of claim 1, further comprising:
   creating a plurality of copies of the new VGUID object; and
   storing each of the plurality of copies of the new VGUID object in the DOS.

3. The method of claim 1, wherein the serializer object is identified using a globally unique identifier (GUID).

4. The method of claim 1, wherein a first root node is associated with the first serializer and a second root node is associated with the second serializer.

5. The method of claim 4, wherein the first root node is configured to find at least one of the plurality of nodes.

6. The method of claim 1, further comprising:
   reuniting the first partition and the second partition of the DOS to obtain a united DOS; and
   selecting a root node based on a globally unique identifier (GUID) of the first serializer and a GUID of the second serializer.

7. The method of claim 6, further comprising:
   disabling the first serializer, wherein the second generation number exceeds the first generation number.

8. The method of claim 1, further comprising:
   using the second serializer to assign an order to the request to update the object.

9. The method of claim 1, wherein the node comprises a globally unique identifier (GUID) for each of the plurality of nodes.

10. The method of claim 1, wherein the first serializer comprises a total number of nodes and wherein the count equals at least two-thirds of the total number of nodes.

11. The method of claim 1, wherein the first serializer comprises a total number of nodes and wherein the count equals at least one-half of the total number of nodes.

12. The method of claim 1, further comprising:
   signing the new VGUID object using a private key of the second serializer.

13. The method of claim 12, wherein the private key is partitioned into a plurality of shares and each of the plurality of nodes comprises at least one of the plurality of shares.

14. The method of claim 6, further comprising:
   disabling the second serializer, wherein the second generation number exceeds the first generation number.

15. A system for serializer maintenance and coalescing in a distributed object store (DOS) having a first partition and a second partition, comprising:
   a processor;
   a memory operatively connected to the processor and configured to store the first partition and the second partition;
   an object in the first partition comprising an active globally unique identifier (AGUID) object to identify the object and to identify a serializer object associated with the object, and a version globally unique identifier (VGUID) object referenced by a first pointer in the AGUID object, wherein the object is configured to be updated with a first new VGUID object;
   a copy of the object in the second partition comprising a copy of the AGUID and a copy of the VGUID object;
   a first serializer comprising a first root node in the first partition and when executed by the processor is configured to determine an order of the first new VGUID object, wherein the first serializer is identified by a globally unique identifier (GUID) and associated with a first generation number; and
   a second root node in the second partition configured to determine an existence of a second serializer in the second partition by counting a plurality of nodes in the second partition storing the serializer object, wherein the second root node is further configured to create the second serializer in the second partition after counting the plurality of nodes, and wherein the second serializer is identified by the GUID and associated with a second generation number,
   wherein the first serializer is responsible for ordering updates made to the object in the first partition and the second serializer is responsible for ordering updates made to the copy of the object in the second partition.

16. The system of claim 15, further comprising:
   a client configured to send a request for an update of the object.

17. The system of claim 16, wherein the request comprises a VGUID template.

18. The system of claim 15, wherein the copy of the object is configured to be updated with a second new VGUID object.

19. The system of claim 18, wherein the second serializer is configured to determine an order of the second new VGUID object associated with the copy of the object.

20. The system of claim 18, wherein the first new VGUID object comprises the first generation number and the GUID, and the second new VGUID object comprises the second generation number and the GUID.

21. The system of claim 15, wherein the first serializer is configured to update the first pointer of the AGUID object to reference the first new VGUID object, and wherein the first new VGUID object further comprises a second pointer referencing the VGUID object.

22. The system of claim 15, wherein the first partition and the second partition unite to obtain a united DOS.

23. The system of claim 22, further comprising:
   a third serializer, wherein the third serializer is one selected from the first serializer and the second serializer, and wherein the third serializer is associated with a third generation number and comprises a plurality of nodes; and
   a third root node located in the united DOS configured to locate the plurality of nodes.

24. The system of claim 23, wherein the third serializer is configured to determine the order of a third new VGUID object in the united DOS, wherein the third new VGUID object comprises the third generation number and the GUID.

25. The system of claim 23, wherein the third root node is one selected from the first root node and the second root node.

26. The system of claim 23, wherein the third root node is further configured to disable the second serializer, wherein the second generation number exceeds the first generation number.

27. The system of claim 23, wherein the third root node is further configured to disable the first serializer, wherein the first generation number exceeds the second generation number.

28. The system of claim 15, wherein the second serializer comprises a total number of nodes and wherein the count equals at least two-thirds of the total number of nodes.

29. The system of claim 15, wherein the second serializer comprises a total number of nodes and wherein the count equals at least one-half of the total number of nodes.

30. The system of claim 15, wherein the first serializer is further configured to sign the first new VGUID object using a private key.

31. A computer readable medium storing instructions for serializer maintenance and coalescing in a distributed object store (DOS) having a first partition and a second partition, the instructions comprising functionality to:
   receive a request to update an object in the DOS, wherein the object comprises an active globally unique identifier (AGUID) object to identify the object and to identify a serializer object associated with the object, wherein the object further comprises a version globally unique identifier (VGUID) object referenced by a first pointer in the AGUID object, and wherein the VGUID object represents an update to the object and comprises a first generation number associated with the serializer object;
   count a plurality of nodes storing the serializer object in the first partition to generate a count, wherein the count determines an existence of a first serializer in the first partition;
   construct a second serializer based on the count by copying the serializer object to an additional node in the first partition;
   assigning a second generation number to the second serializer, wherein the second serializer comprises the plurality of nodes and the additional node after copying the serializer object;
   populate a new VGUID object comprising a new version number and the second generation number using the second serializer, wherein the new VGUID object further comprises a second pointer referencing the VGUID object; and
   update the first pointer of the AGUID to reference the new VGUID.

* * * * *